(12) United States Patent
Gruener, Sr.

(10) Patent No.: US 7,306,010 B2
(45) Date of Patent: Dec. 11, 2007

(54) BALL VALVE WITH SNAP-IN STEM

(75) Inventor: Robert B. Gruener, Sr., Mishawaka, IN (US)

(73) Assignee: Nibco Inc., Elkhart, IN (US)

( * ) Notice: Subject to any disclaimer, the term of this patent is extended or adjusted under 35 U.S.C. 154(b) by 261 days.

(21) Appl. No.: 11/058,015

(22) Filed: Feb. 15, 2005

(65) Prior Publication Data

US 2006/0180218 A1  Aug. 17, 2006

(51) Int. Cl.
*F16K 17/14*  (2006.01)

(52) U.S. Cl. .............. 137/797; 137/15.22; 137/315.18; 137/315.41; 251/315.14; 251/315.16

(58) Field of Classification Search ............. 137/15.22, 137/315.18, 315.17, 797, 315.41; 251/315.01, 251/315.14, 315.16
See application file for complete search history.

(56) References Cited

U.S. PATENT DOCUMENTS

| | | | |
|---|---|---|---|
| 3,112,758 A | 12/1963 | Norton | |
| 3,288,430 A * | 11/1966 | Priese | 251/315.14 |
| 3,472,427 A * | 10/1969 | Schaefer | 222/147 |
| 3,550,902 A | 12/1970 | Pidgeon et al. | |
| 3,819,149 A | 6/1974 | Kinder | |
| 4,068,822 A * | 1/1978 | Richards | 251/315.14 |
| 4,103,865 A | 8/1978 | Nanba et al. | |
| 4,175,726 A * | 11/1979 | Richards | 251/315.14 |
| 4,257,575 A * | 3/1981 | Runyan | 251/292 |
| 4,327,895 A | 5/1982 | Blumenkranz et al. | |
| 4,540,157 A | 9/1985 | Kawanami | |
| 4,605,199 A | 8/1986 | Bonissone et al. | |
| 4,605,202 A | 8/1986 | Tsuno et al. | |
| 4,667,928 A | 5/1987 | Davatz et al. | |
| 4,936,545 A | 6/1990 | Ferrero | |
| 4,946,079 A | 8/1990 | Campbell | |
| 5,031,876 A | 7/1991 | Giacomini | |
| 5,076,541 A | 12/1991 | Daghe et al. | |
| 5,090,447 A | 2/1992 | Lewis et al. | |
| 5,102,098 A | 4/1992 | Daghe et al. | |
| 5,350,091 A | 9/1994 | Leete et al. | |
| D372,073 S | 7/1996 | Ozaki et al. | |
| 5,785,074 A * | 7/1998 | Kieper | 137/68.11 |
| 5,862,721 A | 1/1999 | Kowats | |
| 5,992,823 A | 11/1999 | Hung-Lin | |
| D455,474 S | 4/2002 | Knobel et al. | |
| 2002/0145126 A1* | 10/2002 | Lian | 251/315.14 |

* cited by examiner

*Primary Examiner*—Eric Keasel
*Assistant Examiner*—Craig Schneider
(74) *Attorney, Agent, or Firm*—Price, Heneveld, Cooper, DeWitt & Litton, LLP

(57) ABSTRACT

A ball valve has a ball with resilient, opposed facing spaced-apart locking arms which engage a stem having outwardly projecting flanges to allow the stem to be inserted externally into the valve body and snap-locked to the resilient opposed locking arms of the ball. In one embodiment, the stem includes a breakaway groove to prevent over torquing of the stem. In another embodiment, a retainer carrier for the ball includes slots for receiving integrally formed projection tabs on the underside of the valve handle which are spaced and sized to interfit with the slots of the threaded retainer carrier such that, if ball or seal replacement becomes necessary, the valve handle itself can serve as a removal tool for the retainer carrier.

7 Claims, 4 Drawing Sheets

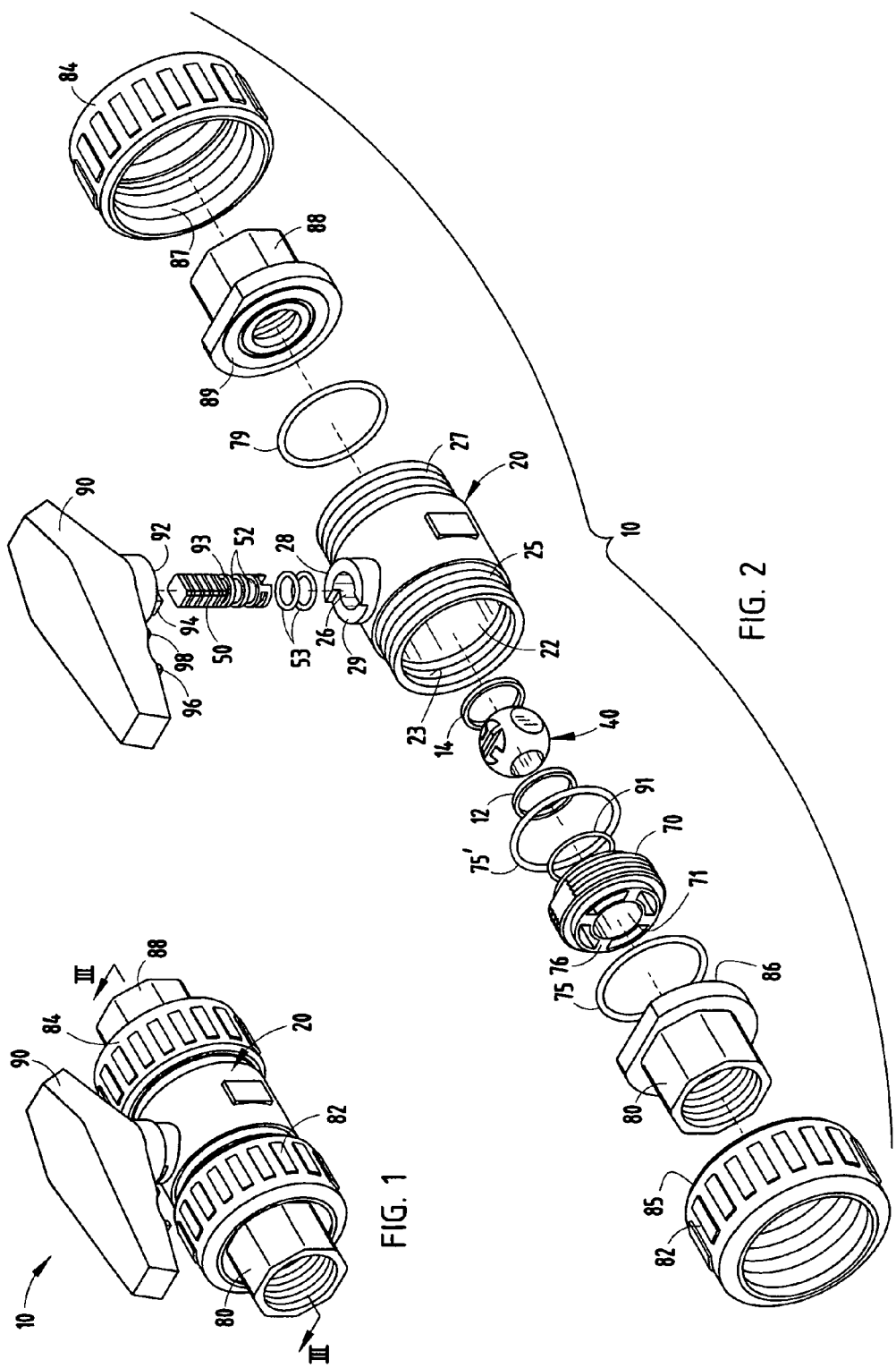

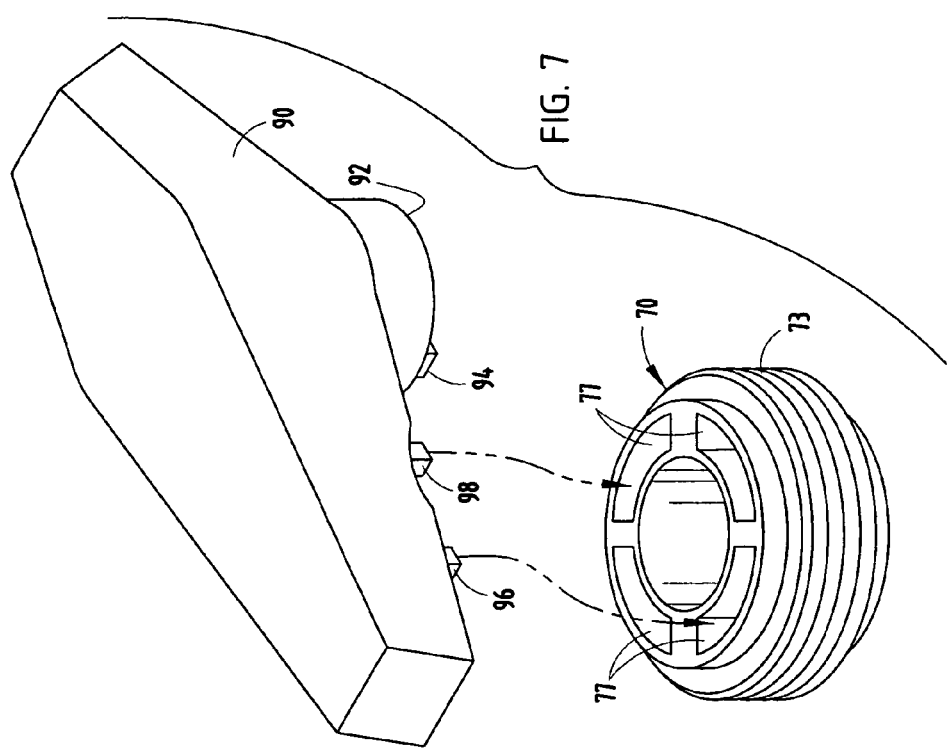
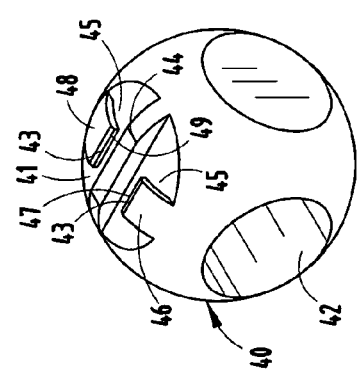
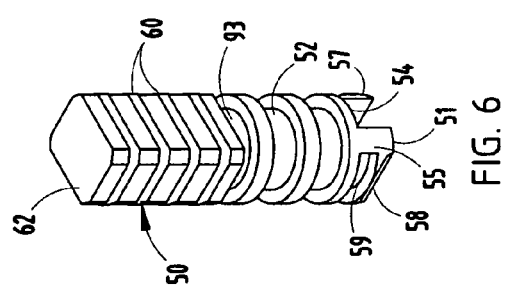
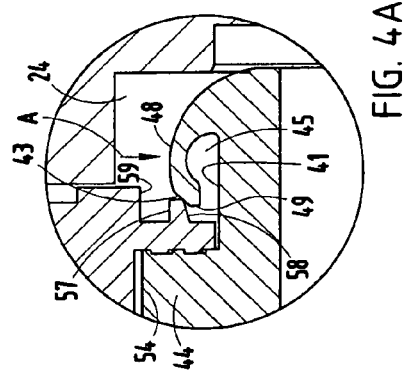
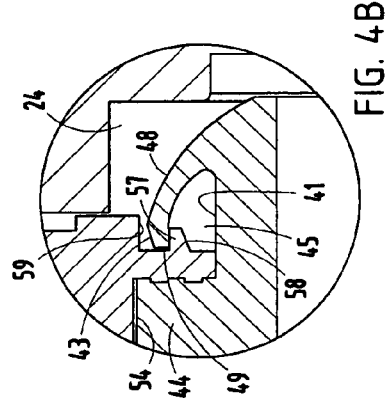

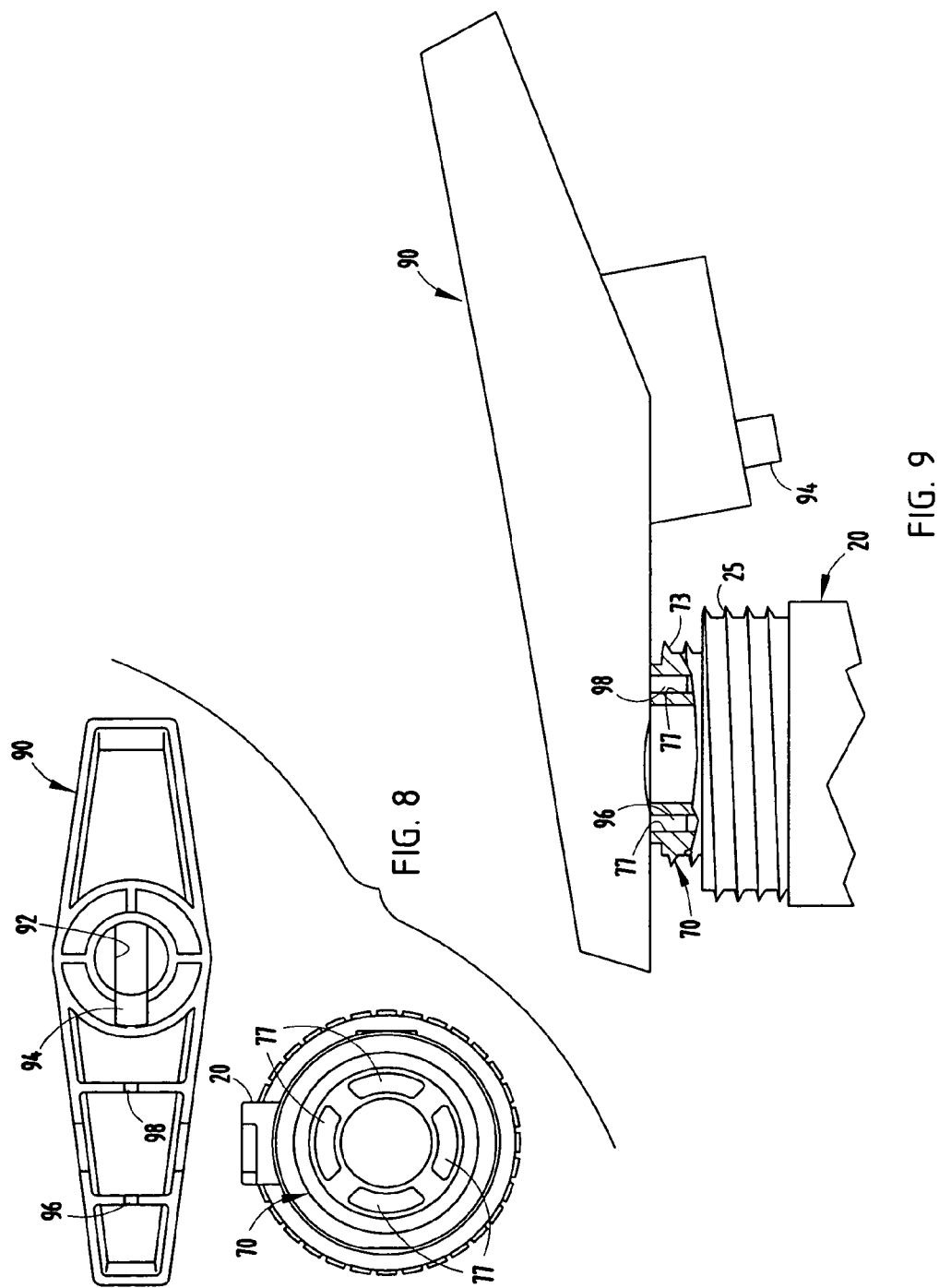

BALL VALVE WITH SNAP-IN STEM

BACKGROUND OF THE INVENTION

The present invention relates to quarter-turn ball valves with an improved coupling between the ball and stem.

Typical ball valves have a housing which includes an axially extending fluid communication path and a ball receiving chamber into which a ball element of the valve is inserted. The valve body also includes an opening extending orthogonally to the flow path for receiving a stem which typically includes a locking flange, such that the stem can be inserted through the stem aperture from the ball valve chamber and the ball subsequently loaded into the chamber with interlocking tongue and groove members for coupling the stem and ball. Some ball valve proposals allow the stem to be inserted from the outside of the valve body. Such construction requires a locking flange within the valve body and/or a retainer on the stem to retain the stem in locked position with respect to the valve body. Both of these types of systems are either somewhat difficult to assemble and/or result in more complicated structures for manufacturing. Thus, there exists a need for a ball valve which is both economical to manufacture and which is easy to assemble.

SUMMARY OF THE INVENTION

The ball valve of the present invention satisfies this need by providing a ball valve having a ball with resilient, opposed facing spaced-apart locking arms which engage a stem having outwardly projecting flanges to allow the stem to be inserted externally into the valve body and snap-locked to the resilient opposed locking arms of the ball. In a preferred embodiment also, the edges of the arms facing the stem-receiving aperture and the flanges of the stem are tapered to facilitate the snap insertion of the stem to the ball. In a preferred embodiment, the stem includes a locking groove into which the tips of the locking arms fit once the stem is snap-locked to the ball. Thus, the stem can be readily coupled to the ball externally through the stem opening.

In another embodiment of the invention, the valve stem includes a breakaway groove on a side of the stem distal from the ball such that, if the ball becomes frozen in position, the valve stem will shear at a location outside the stem seals if an excessive force is used to attempt to open the valve. This assures that an effort to open a frozen valve will not result in a broken valve which will leak.

In yet another embodiment, the retainer carrier for the ball includes arcuate slots for receiving projections of a spanner wrench which is integrally formed on the valve handle. In this embodiment, the underside of the valve handle includes a pair of outwardly projecting tabs which are spaced and sized to interfit with the arcuate slots of the threaded retainer carrier such that, if ball or seal replacement becomes necessary, the valve handle itself can serve as a removal tool for the retainer carrier such that the valve can be disassembled without the need for special or additional tools. In the most preferred embodiment of the invention, the ball valve assembly includes both the interlocking stem feature and one or more of the breakaway stems and the integral handle tool features.

These and other features, objects and advantages of the present invention will become apparent upon reading the following description thereof together with reference to the accompanying drawings.

BRIEF DESCRIPTION OF THE DRAWINGS

FIG. 1 is a perspective view of the ball valve of the present invention;

FIG. 2 is an enlarged exploded perspective view of the ball valve of the present invention;

FIG. 4A is a greatly enlarged fragmentary cross-sectional of the area IV of FIG. 3 illustrating the snap-locking feature of the ball and stem during insertion of the stem;

FIG. 4B is the structure shown in FIG. 4A after the stem has snap-locked into the ball;

FIG. 5 is an enlarged perspective view of the ball;

FIG. 6 is an enlarged perspective view of the valve stem;

FIG. 7 is an exploded view of the valve handle and retaining spring illustrating the interconnecting elements when the handle is being used as a disassembly tool;

FIG. 8 is a bottom view of the handle and an end view of the ball retainer carrier; and FIG. 9 is an enlarged side elevational view, partly in cross section, showing the interrelationship of the retainer carrier and valve handle used as a tool to remove the retaining ring from the valve body.

DETAILED DESCRIPTION OF THE PREFERRED EMBODIMENT

Figure 3:
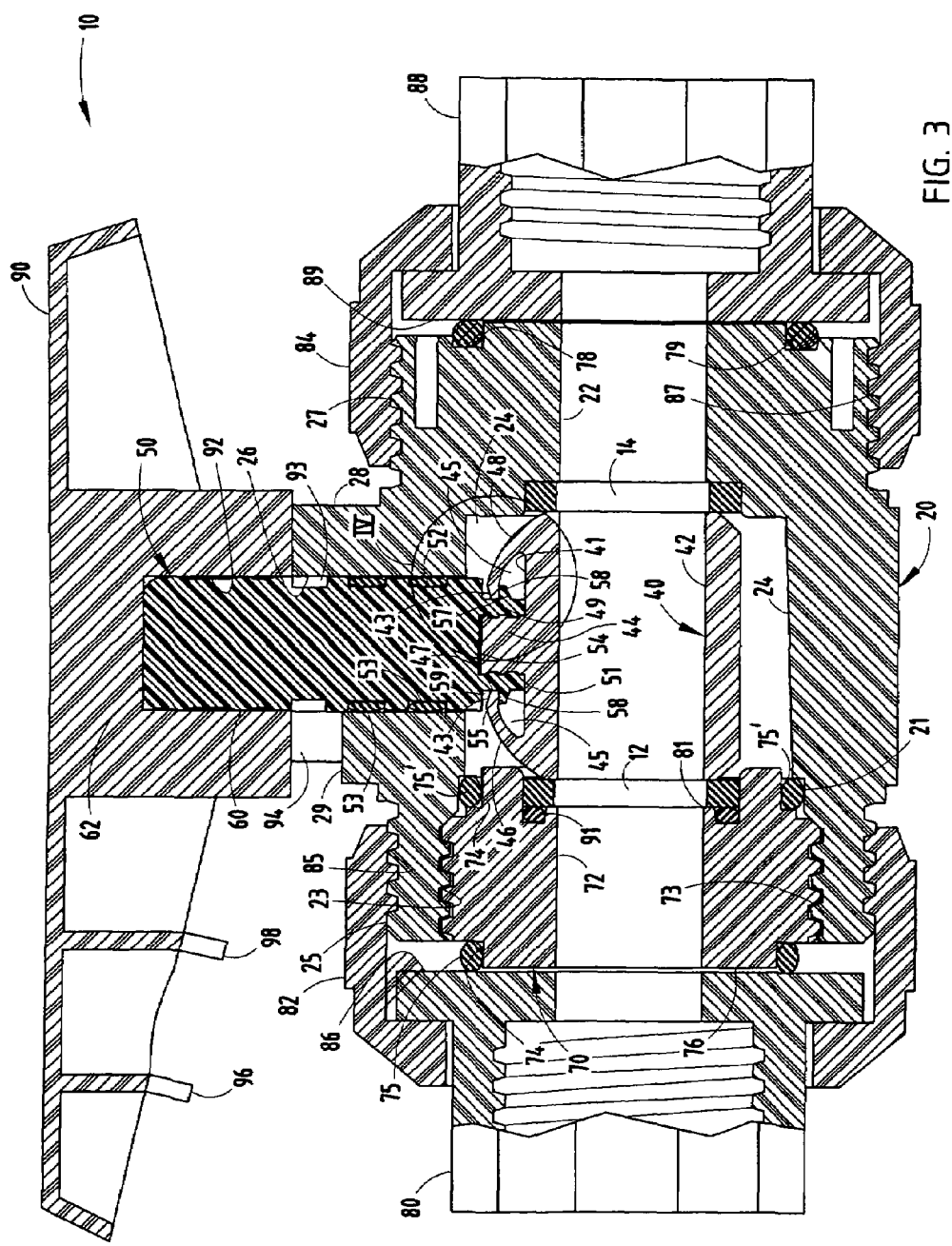
FIG. 3 is a greatly enlarged assembled vertical cross-sectional view of the ball valve of FIGS. 1 and 2.

Referring initially to FIGS. 1-3, there is shown a valve 10 embodying the present invention. The valve includes a valve body 20 having a central axially extending bore 22 providing a fluid flow path through the valve body, a central ball-receiving chamber 24 (as best seen in FIG. 3), and a stem-receiving bore 26 communicating with chamber 24. Chamber 24 is internally threaded at end 23 for receiving a threaded retainer carrier 70, which also includes a cylindrical axially extending bore 71 aligned with valve bore 22. Body 20 includes a quarter-turn limiting handle mounting boss 28 which includes an arcuate slot 29 formed therein which cooperates with a projecting tab 94 on handle 90 for limiting the range of motion of the ball valve to 90° or a quarter turn in a controlled manner. Valve body 20 has opposed ends 25 and 27 which are externally threaded for receiving union nuts as described below.

The ball chamber 24 receives a pair of ball seat seals 12 and 14, as seen in FIGS. 2 and 3, and valve ball 40 which includes a bore 42 having a diameter substantially the same as the diameter of bore 22 of valve body 20. The ball and remaining valve elements are injection molded of a suitable polymeric material, such as PVC, polypropylene, nylon, or the like. The ball 40, as seen in detail in FIG. 5, is generally spherical and includes, extending from an upper end, an upwardly projecting generally rectangular rib 44 and integral arcuate inwardly curved locking arms 46 and 48 which are spaced from an upper surface 41 of ball 40 to define an open space 45, as best seen in FIG. 3, allowing the deflection of the resilient arms 46 and 48 for assembly of the stem 50 therein as described below. The tips 47 and 49 of arms 46 and 48, respectively, are spaced apart in spaced relationship to rib 44 and each includes beveled leading edge 43 to facilitate the snap insertion of the stem.

The stem 50, shown in detail in FIG. 6, includes a plurality of spaced-apart annular grooves 52 for receiving O-rings 53 (FIGS. 2 and 3) for sealing the stem within bore 26 of the valve body 20. Above grooves 52 is a breakaway groove 93 located axially on stem 50 distal from ball 40. The purpose and function of groove 93 is discussed below. The lower end of stem 50 includes a rectangular slot 54 for receiving rib 44 in interlocking engagement, such that rotation of the stem 50 will rotate ball 40 between open and closed positions. Spaced from the end 51 of stem 50 are a pair of outwardly projecting tabs 55 and 57, each with tapered leading edges 58, such that the stem can be inserted downwardly in the direction indicated by arrow A in the fragmentary views of FIG. 4A to initially engage the tapered edge 43 of the interlocking arms 46, 48 for insertion of the tip ends 47 and 49 of the arms into the retainer grooves 59 in stem 50. Once the tip ends 47 and 49 of deflectable arms 46 and 48 clear tabs 55 and 57 they snap into the retainer groove 59, interlocking the stem 50 to the ball 40, as best seen in FIG. 3. Stem 50 also includes outwardly projecting annular ribs 60 (FIGS. 3 and 6) which allow the handle 90 to be press-fit onto stem 50 for holding the handle 90 to the valve stem.

Ball 40 is held within the valve body 20 by a retainer carrier 70 which is externally threaded at 73 to interlock with the internal threads 23 of valve body 20. Retainer carrier 70 includes an axially extending bore 72 which aligns with bore 42 in ball 40 when the valve is in an open position, as shown in FIG. 3, and aligns also with bore 22 in valve body 20. The retainer carrier includes collars 74 at opposite ends for receiving O-rings 75, 75' and an annular groove for receiving a sealing O-ring 91 (FIGS. 2 and 3). O-ring 75 extends outwardly from the face 76 of retainer 70 and engages the face 86 of a first end connector 80 (FIG. 2) which is held in place by a union nut 82 internally threaded at 85 to screw onto the threaded end 25 of valve body 20. O-ring 75' seats against annular collar 21 of valve body 20, as seen in FIG. 3, to seal the retainer 70 to ball chamber 24. The threaded end 27 of valve body 20 also includes an O-ring retaining groove 78 for receiving an O-ring 79, as shown in FIG. 2. A second end connector 88 has a face 89 which sealably engages O-ring 79 and is held thereto by a union nut 84 which is internally threaded at 87 to threaded end 27 of valve body 20, thereby completing the valve body assembly. Connectors 80 and 88 are internally threaded for receiving externally threaded pipe fittings. In some embodiments, they may not be threaded to allow polymeric pipes to be adhesively bonded to the valve 10.

The valve handle 90 includes a central, downwardly extending aperture 92 through which the upper end of valve stem 50 extends in press-fit engagement to secure the valve to the stem. The interfit allows handle 90 to be removed for use as a tool as discussed below. The handle includes a downwardly extending tab 94 which rides within slot 29 of valve body 20 to limit the motion of the ball to within 90° between fully open and fully closed position as the tab rides within the arcuate slot 29. The valve handle also includes a pair of downwardly projecting spaced-apart tabs 96 and 98 extending from the underside of the handle for serving as a spanner wrench, as described in detail below with references to FIGS. 5, 8, and 9.

One unique feature of the valve assembly 10 of the present invention is the provision of the breakaway groove 93 in valve stem 50. In the event the ball becomes stuck due to the entry of foreign material or the like within the valve body, efforts to open or close the valve could, without the addition of the breakaway groove, result in the over torquing of valve stem 50 which could fracture the valve stem or even the valve body, resulting in a leaking and broken valve. In order to prevent such an occurrence, the breakaway groove 93 is designed to shear the valve stem before any breakage of any sealed areas of the valve body or valve stem area can occur. The breakaway groove 93 is positioned above the O-ring seals 53, as seen in FIG. 2, at an end of valve stem 50 distal from ball 40. Over torquing of the valve handle 90 to free a stuck valve will, before the fracture of internal parts of the valve or the valve body itself occur, shear the valve stem at point 93, which allows the valve body to remain sealed against fluid leakage. The depth and height of the breakaway groove depends upon the material and size of the ball valve. In one example for a 1" diameter ball valve 40 where the outer diameter of the valve stem is 0.64", the depth of the valve breakaway groove was 0.095" with a height of 0.08" to allow a breakaway torque of approximately 60 foot inches for a PVC material valve assembly. As the polymeric material is changed for the valve body or the size of the valve assembly, including the ball and stem, is changed, the specific dimensions of the breakaway groove may be changed to provide an appropriate shear torque which protects the sealed integrity of the valve assembly.

Referring now to FIGS. 5, 8 and 9, an end view of the valve body 20 is shown in FIG. 8 in which the retainer carrier 70 is shown and includes angularly spaced-apart arcuate slots 77 which are shaped to receive the downwardly projecting tabs 96 and 98 of handle 90, as seen in FIG. 9, such that the handle, once removed from the valve body, can be used to rotate the retainer carrier 70 from the valve body, as illustrated in FIG. 9, for disassembly should an O-ring seal need to be replaced or should the ball 40 become worn and need replacement.

Assembly of the ball valve 10 is provided by first inserting the ball seal seat 14 in the valve body, after which ball 40 is inserted and held in place with the rib 44 pointing upwardly and aligned with the axial bore 26. Next, valve stem 50 with O-rings 53 installed thereon is inserted in the valve body and pushed downwardly, as indicated by arrow A in FIG. 4A, with the leading tapered edges 58 of the stem tabs 55 and 57 engaging tapered edges 43 of the resilient locking arms 46 and 48 to deflect the arms downwardly into the open space 45 sufficiently to allow the tabs 55 and 57 to clear the tips 47 and 49 of arms 46 and 48. This allows the stems to snap into locking groove 59, thereby interlocking the stem to the ball, such that the ball can be rotated between a fully open position (FIG. 3) and various closed positions, including a fully closed position in which the ball is rotated 90° to the position shown in FIG. 3, thereby effectively sealing the flow path of the valve in a conventional manner. This, of course, is achieved once the valve assembly is completed and handle 90 is press-fit onto upper end 62 of the stem, such that the handle tab 94 is aligned with slot 29. O-ring 21 is inserted within the retaining carrier 70 and seat seal 12 is then inserted within the valve body followed by threading the retaining carrier 70 with the O-ring 91, ball seat seal 12 and O-ring 75' into the valve body such that the annular surface of ball seat seal 12 engages ball 40, as seen in FIG. 3, to sealably hold the ball within the ball-receiving chamber 24. Subsequently, O-ring 75 is installed onto retaining carrier 70, O-ring 79 is installed onto body 20 over collar 78 and end connectors 80 and 88 are held to the valve body by union nuts 82 and 84, respectively, to complete the valve assembly 10.

If it becomes necessary to repair the valve by either replacing ball seat seals 12, 14 or an O-ring, such as O-ring 75' or the ball 40 itself, handle 90 can be removed and tabs 96 and 98 employed once union nut 82 and connector 80 are removed to engage slots 77 in retainer carrier 70, as illustrated in FIGS. 5, 8, and 9, for disassembly of the valve. For removal of the ball, the valve is positioned in a fully closed position which aligns the generally rectangular rib 44 in an axial direction, allowing the ball to slide axially through the open end of the valve body when the retainer carrier 70 has been removed. The retainer groove 59 is sized, as is the spacing between tips 47 and 49 of arms 46 and 48, respectively, to allow the ball to be freely removed when rib 44 is aligned with the axial port of the valve body (i.e., orthogonal to that shown in FIG. 3).

The valve assembly of the present invention, therefore, provides a relatively inexpensively manufactured and easily assembled ball valve which is both durable, prevents accidental breakage, and allows disassembly, if necessary, utilizing the valve handle itself as a disassembly tool.

It will become apparent to those skilled in the art that various modifications to the preferred embodiment of the invention as described herein can be made without departing from the spirit or scope of the invention as defined by the appended claims.

The invention claimed is:

1. A ball valve assembly comprising:
   a valve body, including a ball-receiving chamber, an inlet port, and an outlet port on opposite sides of said ball-receiving chamber, and said valve body further including a stem receiving bore communicating with said chamber;
   a ball for positioning in said chamber, said ball including a bore which can be selectively aligned in said chamber with the inlet and outlet ports; and
   a valve stem separate from said ball and extending in said bore for coupling to said ball once said ball is installed in said chamber, said stem then employed for rotating said ball between open and closed positions;
   a retainer carrier threaded within the valve body for retaining said ball in said chamber, wherein said retainer carrier has at least a pair of spaced-apart slots formed in an outwardly extending face thereof; and
   a valve handle which is removable from said stem, wherein said handle includes a pair of spaced-apart outwardly extending tabs facing said valve body and which are aligned to fit within said slots of said retaining carrier when said handle is removed, such that said handle can be used as a tool for removal of the threaded retainer carrier from the valve body.

2. The assembly as defined in claim 1 wherein said stem includes at least one seal and a breakaway groove on a side of said seal opposite said ball to prevent over torquing of said stem.

3. A ball valve assembly comprising:
   a valve body, including a ball-receiving chamber and inlet and outlet ports on opposite sides of said ball-receiving chamber, said valve body further including a stem receiving bore;
   a polymeric ball, including a bore which can be selectively aligned in said chamber with said inlet and outlet ports, wherein said ball includes an outwardly extending rib for interlocking with a corresponding groove in a stem, wherein said ball includes a pair of opposed resiliently deformable arcuate arms having spaced-apart tip ends with beveled edges facing said bore; and
   a valve stem molded of a polymeric material separate from said ball and including a groove for interlocking with said rib of said ball once said ball is positioned in said chamber, said stem including outwardly projecting legs for extending under the tip ends of said resilient arms of said ball, said stem including a recess axially spaced from said legs for receiving said arms of said ball when said stem is snap-inserted into said ball, wherein said legs of said stem are tapered to facilitate insertion of said stem into said arms of the ball, and
   wherein said stem includes at least one seal and a breakaway groove on a side of said seal opposite said ball to prevent over torquing of said stem.

4. The assembly as defined in claim 3 wherein said valve includes a retainer carrier which is threaded within said valve body for retaining said ball in said chamber.

5. The assembly as defined in claim 4 wherein said retainer carrier has at least a pair of spaced-apart slots formed in an outwardly extending face thereof.

6. The assembly as defined in claim 5 wherein said valve includes a handle which is removable from said stem and wherein said handle includes a pair of spaced-apart outwardly extending tabs which are aligned to fit within said slots of said retainer carrier such that said handle can be used as a tool for removal of said retainer carrier from the valve body.

7. A ball valve assembly comprising:
   a valve body, including a ball-receiving chamber and inlet and outlet ports, said valve body further including a stem receiving bore communicating with said chamber;
   a polymeric ball for positioning in said chamber, said ball including a bore which can be selectively aligned in said chamber with said inlet and outlet ports, wherein said ball includes an outwardly extending rib for interlocking with a groove in a stem, and wherein said ball includes a pair of opposed resiliently deformable arms having spaced-apart tip ends;
   a polymeric valve stem separate from said ball, said stem including a groove at one end for interlocking with said rib of said ball, and including outwardly projecting legs for extending under the tip ends of said resilient arms of said ball, said stem including a recess axially spaced from said legs for receiving said arms of said ball when said stem is snap-inserted into said ball to connect said stem to said ball once said ball is positioned in said chamber of said valve body; and
   wherein said valve includes a retainer carrier which is threaded within said valve body for retaining said ball in said chamber and said retainer carrier has at least a pair of spaced-apart slots formed in an outwardly extending face thereof; and
   wherein the valve includes a handle which is removable from said stem and wherein said handle includes a pair of spaced-apart outwardly extending tabs which are aligned to fit within said slots of said retainer carrier such that said handle can be used as a tool for removal of said retainer carrier from said valve body.

* * * * *